(12) United States Patent
Tetlow et al.

(10) Patent No.: US 8,677,784 B2
(45) Date of Patent: Mar. 25, 2014

(54) GRAVITY BENDING GLASS SHEETS

(75) Inventors: Ian Nicholas Tetlow, Tarleton (GB); Ian Michael Mackley, Preston (GB); Colin Michael Bennett, Alvechurch (GB)

(73) Assignee: Pilkington Group Limited, St Helens, Merseyside (GB)

( * ) Notice: Subject to any disclaimer, the term of this patent is extended or adjusted under 35 U.S.C. 154(b) by 270 days.

(21) Appl. No.: 12/747,341

(22) PCT Filed: Dec. 8, 2008

(86) PCT No.: PCT/GB2008/051166
§ 371 (c)(1),
(2), (4) Date: Jun. 10, 2010

(87) PCT Pub. No.: WO2009/074825
PCT Pub. Date: Jun. 18, 2009

(65) Prior Publication Data
US 2010/0269543 A1    Oct. 28, 2010

(30) Foreign Application Priority Data
Dec. 11, 2007  (GB) ................................. 0724162.3

(51) Int. Cl.
*C03B 23/027*    (2006.01)
(52) U.S. Cl.
USPC .................................. 65/107; 65/290; 65/291
(58) Field of Classification Search
USPC .................................... 65/106, 107, 290, 291
See application file for complete search history.

(56) References Cited

U.S. PATENT DOCUMENTS 3,161,493 A * 12/1964 Davidson, Jr. et al. .......... 65/158
3,188,193 A *  6/1965 Doehlert .......................... 65/289

(Continued)

FOREIGN PATENT DOCUMENTS

| AU | 41021/89 B | 10/1988 |
| EP | 0448447 B1 | 1/1995 |

(Continued)

OTHER PUBLICATIONS

International Search Report (PCT/ISA/210) issued on Oct. 9, 2009 by the British Patent Office in its capacity as the International Search Authority in International Application No. PCT/GB2008/051166.

(Continued)

*Primary Examiner* — Matthew Daniels
*Assistant Examiner* — Lisa Herring
(74) *Attorney, Agent, or Firm* — Buchanan Ingersoll & Rooney PC

(57) ABSTRACT

A gravity bending mold for bending glass sheets is disclosed. The gravity bending mold comprises an intermediate mold having an intermediate movable mold section and a final mold having a final movable mold section. Each movable mold section is movable between an operable position and an inoperable position respectively. The intermediate and final movable mold sections are adapted successively to engage a glass sheet during a gravity bending operation. There is a mechanical connection between the intermediate and final movable mold sections, the mechanical connection being selectively disposable in a first configuration, at which the intermediate and final movable mold sections are in the operable and inoperable positions respectively, and in a second configuration, at which the final and intermediate movable mold sections are in the operable position and inoperable positions respectively. When the mechanical connection is moved from the first configuration to the second configuration, the intermediate movable mold section moves to the inoperable position and the final movable mold section correspondingly moves to the operable position to take the place of the intermediate moveable mold section. There is also provided a method of bending glass sheets using such a mold.

20 Claims, 14 Drawing Sheets

(56) References Cited

U.S. PATENT DOCUMENTS

| | | | |
|---|---|---|---|
| 3,235,350 A | 2/1966 | Richardson | |
| 3,281,231 A * | 10/1966 | McKelvey et al. | 65/288 |
| 3,325,267 A | 6/1967 | Leflet, Jr. et al. | |
| 5,660,609 A | 8/1997 | Muller et al. | |
| 6,076,373 A | 6/2000 | Grodziski | |
| 6,158,247 A * | 12/2000 | Didelot | 65/106 |
| 6,357,263 B1 | 3/2002 | Yajima et al. | |
| 2009/0199595 A1 | 8/2009 | Machura et al. | |

FOREIGN PATENT DOCUMENTS

| | | | |
|---|---|---|---|
| EP | 0 640 569 A1 | 3/1995 |
| EP | 0885851 A2 | 12/1998 |
| EP | 1 380 547 A1 | 1/2004 |
| FR | 1 320 422 A | 3/1963 |
| FR | 2 894 955 A1 | 6/2007 |
| JP | H1160256 A | 3/1999 |
| WO | WO 00/29341 A1 | 5/2000 |

OTHER PUBLICATIONS

UK Search Report dated Apr. 9, 2008 issued in the corresponding UK Patent Application No. 0724162.3.

Japanese Office Action dated Feb. 5, 2013 issued in the corresponding Japanese Patent Application No. 2010-537523 and English language summary.

* cited by examiner

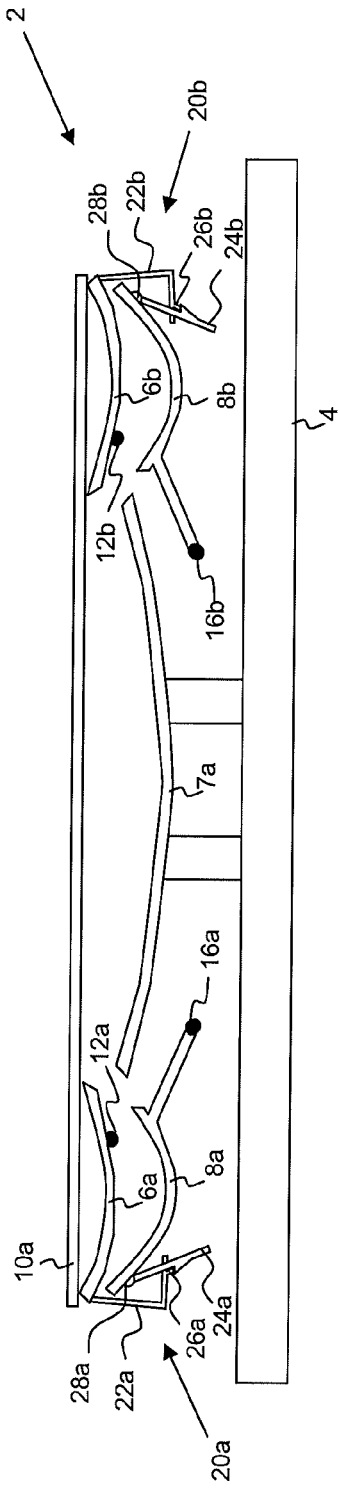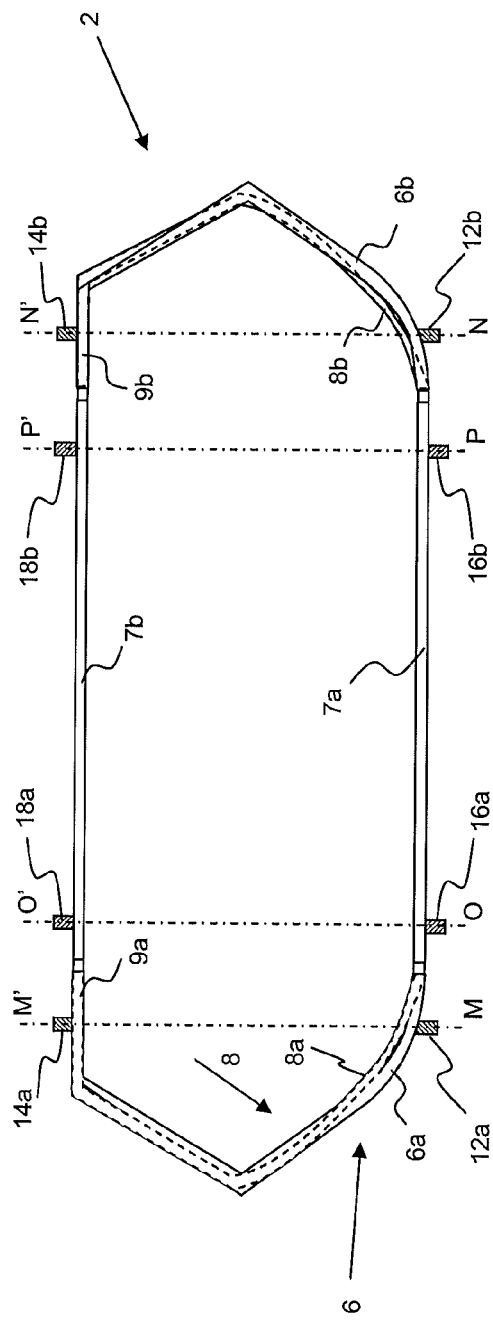
Fig. 1
Fig. 2

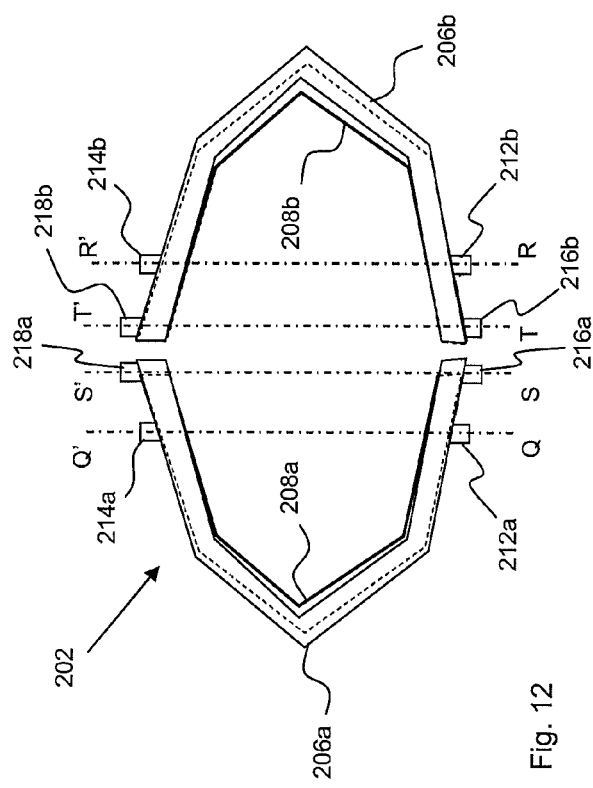
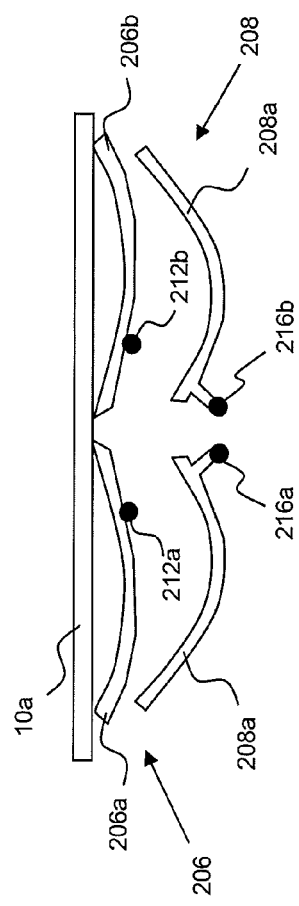
Fig. 12
Fig. 13

GRAVITY BENDING GLASS SHEETS

The present invention relates to a gravity bending mould, and to an apparatus for, and a method of, gravity bending glass sheets. In particular the present invention relates to gravity bending of glass sheets, otherwise known as sag bending, in which the glass sheets are supported on a bending mould while being conveyed through a heating lehr of a glass bending furnace.

It is well known to subject glass sheets to gravity bending to shape the glass sheets for forming vehicle windows, for example automotive windows. A single glass sheet may be bent on the gravity bending mould, or two glass sheets may be bent as a stack on the gravity bending mould when the glass sheets are subsequently to be laminated together to form a laminated windscreen. Many modern automotive windows require a high degree of bending curvature at one or more edges or corners. When such a large curvature is introduced into the glass sheet or sheets, this can cause visible imperfections to be introduced into the glass sheets, reducing the optical quality of the glass sheets. Also, it may be difficult to control the bending operation consistently. Furthermore, for some applications there is a need to have a high degree of surface control so that the curved glass surface better matches the design surface. This may also ensure compatibility of a windscreen with existing windscreen wiper systems.

Furthermore, although it is possible to achieve the high degree of curvature using additional forces other than gravity, such as by using a press bending die adapted to press downwardly on the upper surface of the glass sheets, it is desirable to achieve the desired curvature by using only the force of gravity acting on the glass sheets as they soften and are caused to sag to the desired shape defined by the moulds as the sheets pass through the furnace lehr. This is because if an additional press bending die is used then the upper surface of the glass sheet is contacted during the bending operation, which may lead to a reduction in the surface quality of the glass sheets as a result of inadvertent marking of the upper surface by the die, and also the equipment costs are increased. In addition the production rate can be increased by using solely gravity bending as compared to using an additional press bending step.

On a conventional gravity bending mould for bending one or more glass sheets to form a vehicle windscreen, a central portion of the bending mould is static, and two articulated wings are mounted at opposite ends of the central portion. The central portion and the two articulated wings define a peripheral rim which supports the glass sheet or sheets along a peripheral edge of the lower glass surface. The wings are connected to counterweights which apply a rotational force to the wings, tending to rotate the wings upwardly, each about a respective pivot axis, from a substantially horizontal open initial position to a closed bent position in which the rim forms the desired bent shape of the glass sheets.

Initially, the wings are pushed downwardly to the substantially horizontal open initial position and the glass sheet or sheets are placed on the bending mould, whereby the glass sheet or sheets are supported horizontally by the portions of the peripheral rim in the wings. The assembly of the glass sheet or sheets on the gravity bending mould is then passed through a heating lehr. As the glass heats it softens and progressively sags downwardly under gravity, permitting the articulated wings progressively to be rotated upwardly about their respective pivot axes under the action of the counterweights, thereby to close the mould. In the final fully closed position, the glass sheet or sheets are supported around their entire periphery by both the portions of the peripheral rim in the wings and by the portions of the peripheral rim in the central portion.

Sometimes a high degree of curvature is desired to be introduced into the edges or corners of the glass sheets. It is known to employ an auxiliary rim provided adjacent to the rim in the articulated wing. The auxiliary rim is either mounted on the articulated wing, or is part of an auxiliary wing which is mounted to a support for the central portion.

U.S. Pat. No. 3,235,350 discloses a gravity bending mould incorporating a pair of adjacent wing portions at each end of the central portion a gravity bending mould. The first wing portion operates in an initial bending operation and then the second wing portion takes over to complete the bending operation. This mould is complicated and not suitable for making modern vehicle windscreens of high curvature in regions located at the ends or edges of the glass sheets.

EP-A-1380547 discloses a gravity bending mould having a first mould for supporting a peripheral portion of a glass sheet and a second mould provided inside the first mould. Heating the glass sheet causes it to soften and bend under the action of gravity, whereafter the sheet is supported by the first mould. The softened glass sheet is transferred to the second mould by moving the first mould in a direction to laterally spread the first mould with respect to the second.

Known gravity bending moulds of the type described above usually mark the glass where there is contact between the glass sheet and the mould because the rim leaves an imprint on the softened glass. For a gravity bending mould having two rims (a rim and an auxiliary rim), this problem is worsened because each rim can leave an imprint on the softened glass.

The present invention aims at least partially to overcome the problems of these known gravity bending moulds.

Accordingly, the present invention provides from a first aspect a gravity bending mould for bending glass sheets comprising an intermediate mould having an intermediate movable mould section, and a final mould having a final movable mould section, each movable mould section being movable between an operable position and an inoperable position respectively, the intermediate and final movable mould sections being adapted successively to engage a glass sheet during a gravity bending operation, and a mechanical connection between the intermediate and final movable mould sections, the mechanical connection being selectively disposable in a first configuration, at which the intermediate and final movable mould sections are in the operable and inoperable positions respectively, and in a second configuration, at which the final and intermediate movable mould sections are in the operable position and inoperable positions respectively, wherein when the mechanical connection is moved from the first configuration to the second configuration, the intermediate movable mould section moves to the inoperable position and the final movable mould section correspondingly moves to the operable position to take the place of the intermediate moveable mould section.

The intermediate mould and the final mould each have an upper shaping rim that is made up of the upper shaping surfaces of the respective mould sections.

Suitably each movable mould section has a respective upper shaping surface, each upper shaping surface being moved along a respective locus between an open position and a closed position when the respective movable mould section is in the operable position, and wherein the loci of the intermediate and final movable mould sections at least partially intersect. Preferably at a location where the loci of the intermediate and final movable mould sections at least partially intersect, the positions of the respective upper shaping surfaces at least partially overlap. Such a feature provides that advantage that the upper shaping surface of the final movable mould is able to take the place of the upper shaping surface of the final movable mould section such that a glass sheet supported by the mould is able to be contacted about substantially the same peripheral line. Therefore the supported surface of a softened glass sheet suffers less marking.

Preferably each movable mould section is adapted to move about a respective intermediate and final pivot axis between an open position and a closed position when the respective movable mould section is in the operable position.

Preferably the mechanical connection supports the intermediate and final pivot axes which are simultaneously translated from an initial position to a final position when the mechanical connection is moved from the first configuration to the second configuration.

In a preferred embodiment the mechanical connection includes a pendulum and the mechanical connection is moved from the first configuration to the second configuration by releasing the pendulum which falls under the action of gravity. Preferably the mechanical connection includes a linkage member that is mechanically connected to the intermediate movable mould section, the respective final movable mould section and the pendulum. Suitably the intermediate movable mould section is pivotally mounted to the linkage member. Suitably the final movable mould section is pivotally mounted to the linkage member. Suitably the pendulum is pivotally mounted to the linkage member.

In a different preferred embodiment, the mechanical connection comprises a first latching mechanism that holds the intermediate movable mould section in the operable position, and which when unlatched, allows the moveable intermediate mould section to move to the inoperable position. Suitably the intermediate movable mould section moves to the inoperable position by dropping away under gravity.

In another embodiment, the mechanical connection comprises a second latching mechanism arranged such that the final movable mould section is connectable with the respective intermediate movable mould section, and when the second latching mechanism is in the latched position, the upper surface of the final movable mould section is lower than the upper surface of the respective intermediate movable mould section, and when unlatched, the upper surface of the final movable mould section moves to a position higher than the upper surface of the respective intermediate movable mould section.

Preferably gravity bending moulds according to the present invention have a means of supporting the final movable mould section when in the closed position.

As is well known in the art, the movable section of each mould may have counterweights mounted thereon to urge the respective movable section upwards as the counterweights fall under the action of gravity. Preferably the final movable mould section comprises one or more counter weights mounted to thereon to urge the respective final movable mould section upwards. Preferably the intermediate movable mould section comprises one or more counter weights mounted thereon to urge the respective movable intermediate mould section upwards.

Usually the intermediate mould has a smaller curvature than the final mould.

The present invention also provides from a second aspect a glass sheet bending apparatus, the apparatus comprising a plurality of gravity bending moulds according to the first aspect of the invention, a furnace, a conveyor system for successively conveying the plurality of gravity bending moulds through the furnace, the furnace including at least one first actuator mechanism provided inside or outside the furnace at a predetermined location along the furnace length, the actuator mechanism being adapted to operate the mechanical connection to cause the mechanical connection to move from the first configuration to the second configuration as each respective gravity bending mould is conveyed past the first actuator mechanism.

The present invention further provides from a third aspect a method of gravity bending a glass sheet, the method comprising the steps of (a) providing a gravity bending mould comprising an intermediate mould having an intermediate rim and at least one intermediate movable mould section, and a final mould having a final rim and at least one final movable mould section; (b) disposing the intermediate mould in a raised position with respect to the final mould; (c) placing at least one flat glass sheet on the intermediate mould with the movable intermediate mould section being in a substantially horizontal open position, the at least one flat glass sheet being supported by at least one portion of the movable intermediate mould section when the intermediate mould is in an open position; (d) gravity bending the at least one flat glass sheet in a furnace by heating the at least one glass sheet, the heating causing softening of the at least one glass sheet thereby to gravity bend the at least one glass sheet, the gravity bending step comprising two phases, (i) a first phase in which the at least one flat glass sheet is bent to an intermediate bent shape by the intermediate mould, such that the intermediate rim contacts the at least one glass sheet about a first peripheral line; and (ii) a second phase, after the first phase, in which the final mould is disposed in a raised position with respect to the intermediate mould, to take the place of the intermediate mould, and the at least one glass sheet is bent from the intermediate bent shape to a final bent shape by closing the final mould, such that the final rim contacts the at least one glass sheet about a second peripheral line, wherein there is partial overlap between the first peripheral line and the second peripheral line.

Suitably, during the first phase, the or each intermediate movable mould section moves into the closed position, thereby substantially completing the intermediate rim.

Suitably, during the second phase, the or each intermediate movable mould section moves into an inoperable position and the or each final movable mould section moves into an operable position such that the or each final movable mould section is able to close.

Embodiments of the present invention will now be described by way of example only with reference to the accompanying drawings, in which:

FIG. 1 is a schematic side elevation of a gravity bending mould for bending glass sheets in accordance with a first aspect of the present invention, the intermediate mould being in an open position prior to the bending operation and the final movable mould sections being in an inoperable position;

FIG. 2 shows schematically a plan view of the gravity bending mould as shown in FIG. 1.

FIG. 12 shows schematically a plan view of another mould according to a first aspect of the invention where the intermediate mould is in an open position and the final movable mould sections are in an inoperable position;

FIG. 13 shows schematically a side view of the mould of FIG. 13;

Figure 3:
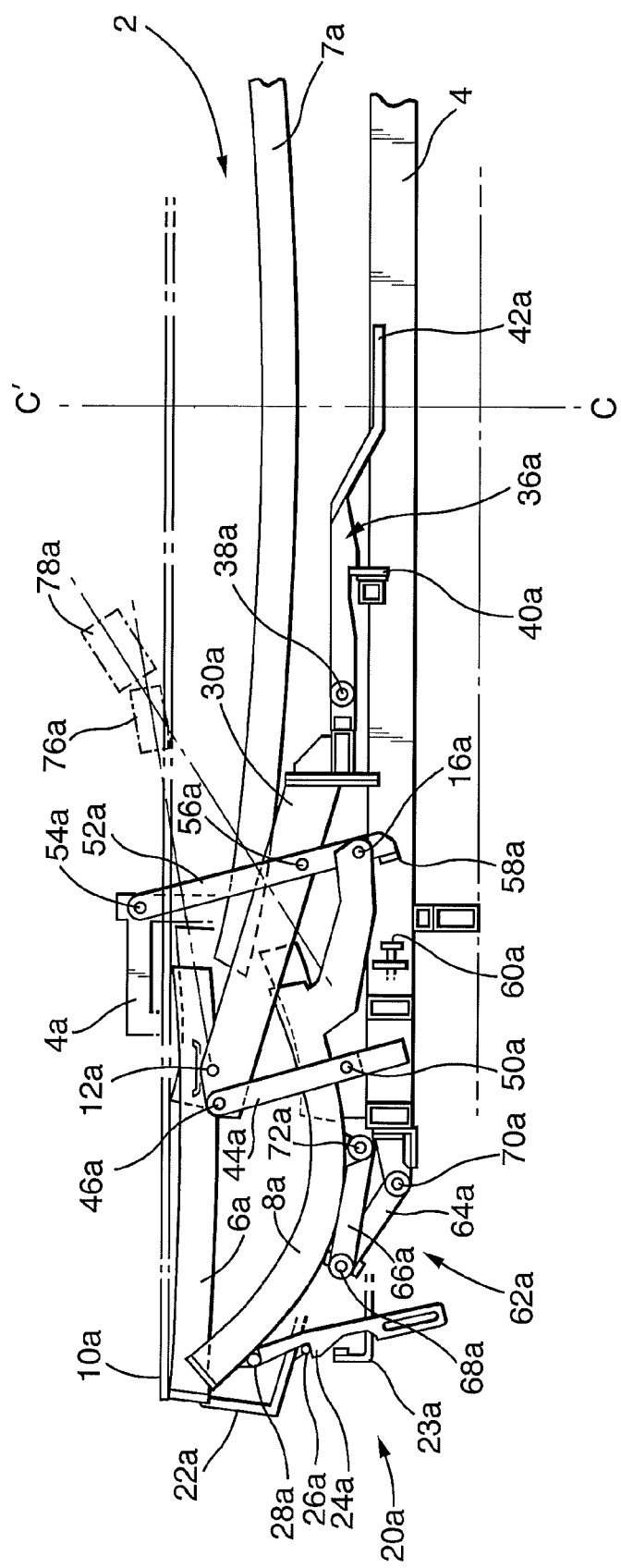
FIG. 3 shows in more detail a view of the left hand side of the gravity bending mould shown in FIG. 1.

With reference to FIGS. 1 and 2, there is shown a gravity bending mould 2 according to an embodiment of the invention. The mould 2 is mounted on a framework 4 and has an intermediate mould 6 and a final mould 8. The framework may be made of steel. The intermediate mould has an intermediate movable mould section 6a mounted at one end of fixed mould sections 7a and 7b. There is another intermediate movable mould section 6b mounted at the other end of the fixed mould sections 7a and 7b. The fixed intermediate mould sections 7a and 7b are fixed to the supporting framework 4 and are used to shape the top and bottom edges of a vehicle windscreen. The final mould 8 has a final movable mould section 8a mounted at one end of the fixed mould sections 7a and 7b. The final mould has another final movable mould section 8b mounted at the other end of the fixed mould sections 7a and 7b. The movable mould sections are often referred to as wings and are of a generally 'U'-shaped configuration. The intermediate mould and the final mould have in common the fixed sections 7a and 7b, these sections being central sections of the moulds.

In FIGS. 1 and 2, the intermediate mould 6 is shown in an "open position". By a mould being in an "open position", it is meant that the upper shaping rim for that mould is not sufficiently complete, such that the mould is not able to shape a sheet of glass to the desired curvature. Accordingly, when the mould is in a "closed position", the upper shaping rim for the particular mould is complete, or substantially complete, such that the mould is able to shape the sheet of glass to the desired, or substantially desired, curvature. The two intermediate movable mould sections 6a, 6b are shown in an operable position because they are able to move into the closed position. The two final movable mould sections 8a, 8b are shown in an inoperable position because the final movable mould sections 8a, 8b are obstructed by the respective intermediate movable mould section 6a, 6b and as such are not able to move into the closed position to close the final mould In the open position shown in FIG. 1 the two movable intermediate mould sections 6a and 6b are substantially horizontal and are shown supporting a flat glass sheet 10a in a substantially horizontal position. The two movable intermediate mould sections 6a and 6b are maintained in this position by the weight and rigidity of the glass sheet.

The intermediate movable mould section 6a can rotate about the pivot axis M-M' defined by pivots 12a and 14a and the intermediate movable mould section 6b can rotate about the pivot axis N-N' defined by pivots 12b and 14b. The pivot axes M-M' and N-N' are positioned such that the intermediate movable mould sections 6a and 6b can rotate into the closed position, thereby closing the final mould. That is, the pivot axes M-M' and N-N' are configured such that the intermediate movable mould sections are in an operable position.

The final movable mould section 8a can rotate about the pivot axis O-O' defined by pivots 16a and 18a and the final movable mould section 8b can rotate about the pivot axis P-P' defined by pivots 16b and 18b. The pivot axes O-O' and P-P' are positioned such that the final movable mould sections 8a and 8b cannot rotate into the closed position. That is, the pivot axes O-O' and P-P' are configured such that the final movable mould sections are in an inoperable position.

The final movable mould section 8a is releasably connected to the intermediate movable mould section 6a by a wing latching mechanism 20a. The wing latching mechanism 20a has a latch pin 26a connected to the intermediate movable mould section 6a via linkage 22a. A latch 24a is pivotally mounted to the final movable mould section 8a by pivot 28a. The wing latching mechanism 20a can be disconnected by releasing the latch pin 26a using a suitable actuator. There is a corresponding wing latching mechanism 20b releasably connecting the intermediate movable mould section 6b to the final movable mould section 8b. The wing latching mechanism 20b has a linkage 22b connected to which is a latch pin 26b, and a latch 24b. The latch 24b is pivotally mounted to the final movable mould section 8b by pivot 28b.

The intermediate mould has two articulated portions 9a and 9b which can open outwardly. The operation of the articulated portion will be described in more detail later.

In FIG. 3 the left hand part of the mould in FIG. 1 is shown in more detail.

The intermediate movable mould section 6a is pivotally mounted between a pair of linkage members 30a, 32a (only 30a is shown). Each linkage member 30a, 32a is mounted to the intermediate movable mould section 6a by pivot 12a, 14a (only 12a is shown). The pivots 12a, 14a define intermediate pivot axis M-M', as described earlier. The linkage members 30a, 32a are connected by a linkage cross member 34a (not shown in this figure). The linkage members 30a, 32a are held by a linkage release mechanism 36a that is pivotally mounted to the linkage cross member 34a by pivot 38a and is shown latched to a stop 40a connected to the framework. In the latched position, the linkage members 30a, 32a do not move relative to the fixed mould sections 7a, 7b or the framework 4. In this latched configuration, the intermediate movable mould section 6a is in the operable position. The linkage members 30a and 32a are unlatched by pushing the latch release arm 42a upwards. There is a corresponding assembly for the right hand side of the mould.

The linkage member 30a has a supporting member 44a that is pivotally mounted at one end by pivot 46a to the linkage member. The other end of the first supporting member 44a is mounted to the framework 4 on a pivot 50a. The first supporting member 44a supports the linkage member 30a at the appropriate height such that the intermediate movable mould section 6a is in the operable position and can rotate about the pivot axis M-M' to close that part of the intermediate mould. There are four linkage members, 30a and 32a associated with the left hand side of the mould, and 30b and 32b associated with the right hand side of the mould. There is a similar supporting member assembly associated with each linkage member.

An elongate displacement member 52a is pivotally mounted to an upright portion 4a of the framework 4 by upper pivot 54a. The displacement member 52a can rotate about the upper pivot 54a in a pendulum like manner. The displacement member 52a has a pair of spaced apart legs, 52b and 52c (which are not shown in this figure) in between which the linkage member 30a is pivotally mounted on the central pivot 56a. Towards the lower end of the displacement member 52a is pivot 16a on which is mounted the final movable section 8a. At the lower end of the displacement member 52a is a toe 58a. The displacement member 52a is shown at an angle to the vertical and is held in this position because the linkage release mechanism 36a is in the latched position. When in this configuration, the intermediate mould section 6a is in the operable position and the final movable mould section 8a is in the inoperable position.

There is a corresponding displacement member 53a pivotally mounted to linkage member 32a by a central pivot 57a and being pivotally mounted to the final movable mould section 8a by pivot 18a. The displacement member 53a is pivotally mounted to the framework by an upper pivot 55a.

The final movable mould section 8a has a strut assembly 62a comprising a pair of strut support elements 64a and 66a pivotally linked together by a pivot 68a at a central part of the strut assembly and each strut support element respectively linked, by a respective pivot 70a, 72a, at the other end thereof to the final movable intermediate mould section 8a and the framework 4. The final movable mould section 8b has a corresponding strut assembly.

The wing latching mechanism further comprises a wing latch release mechanism 23a that can be used to release the latch pin 26a from the latch 24a. The wing latch release mechanism 23a may be independently actuated or may be mechanically connected to the linkage release mechanism 36a.

Shown in phantom is counterweight 76a attached to the intermediate movable mould section 6a and counterweight 78a attached to the final movable mould section 8a. There are corresponding counterweights on the intermediate movable mould section 6b and the final movable mould section 8b.

For clarity, the mould has a degree of symmetry and as such the right hand side of the mould of FIG. 1 is substantially a mirror image about the line C-C' of the view of the left hand side of the mould shown in FIG. 3. The right hand side of the mould has corresponding components having the same reference numeral but designated with the letter 'b' instead of 'a'.

Figure 4:
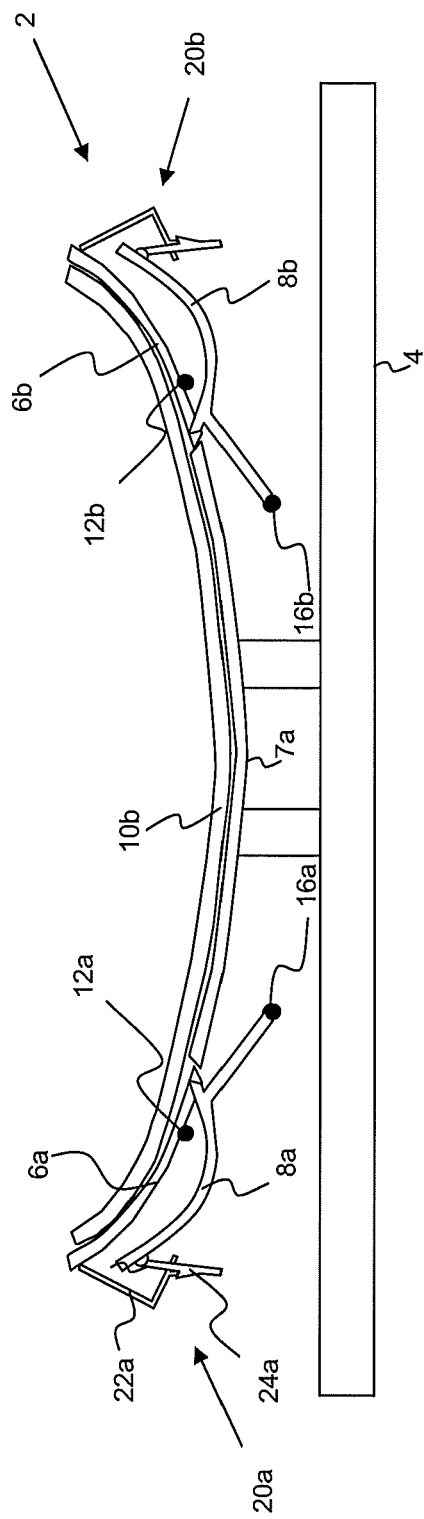
FIG. 4 shows schematically a side elevation of the gravity bending mould shown in FIG. 1 wherein the intermediate mould in the closed position and both the final movable mould sections are in an inoperable position.

FIG. 4 shows a view of the gravity bending mould wherein the intermediate mould 6 is in the closed position. The glass sheet is shown bent to an intermediate curvature 10b and is supported on the intermediate rim defined by the intermediate mould in the closed position. The bent glass sheet 10b is supported on the intermediate mould about a first peripheral line. The movable intermediate mould section 6a, 6b has rotated upwards about the respective intermediate pivot axis M-M', N-N' thereby closing the intermediate mould 6. The final movable mould section 8a, 8b has rotated slightly upwards about the final pivot axis O-O', P-P' because of the connection by wing latch mechanism 20a, 20b between the respective intermediate and final movable mould sections.

Figure 5:
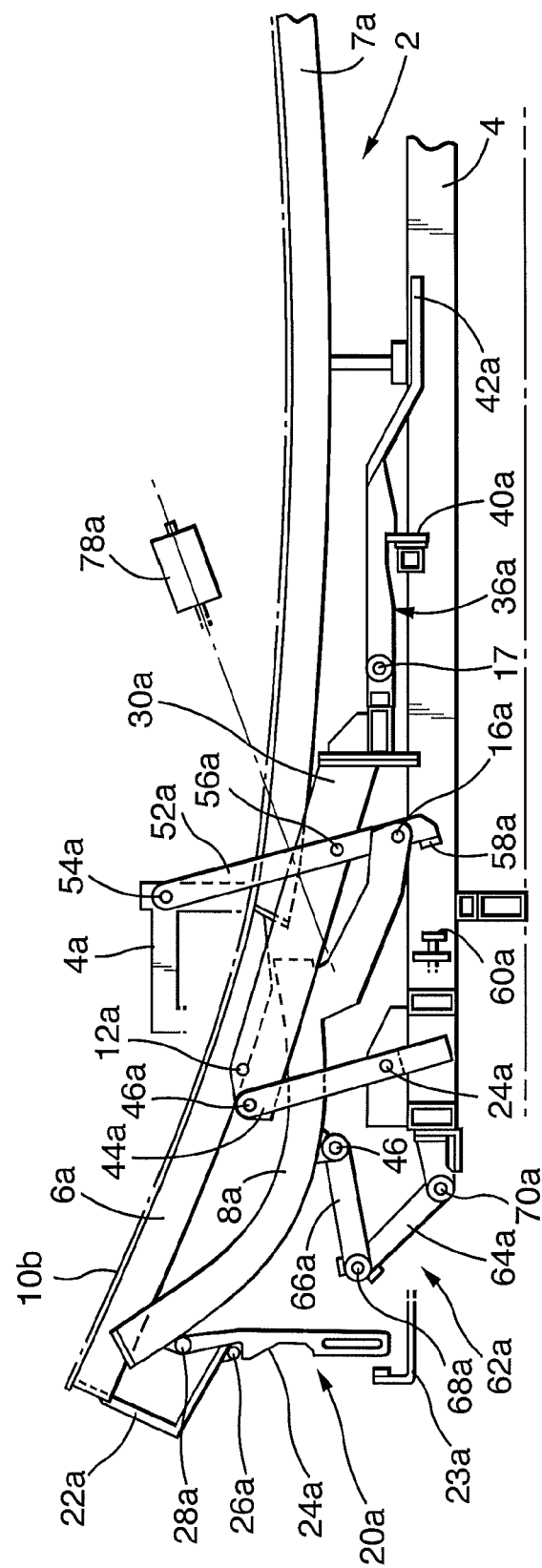
FIG. 5 shows in more detail a view of the left hand side of the gravity bending mould as shown in FIG. 4.

FIG. 5 shows a more detailed view of the left hand side of the mould shown in FIG. 4. The linkage member 30a has remained static because the linkage release mechanism 36a is in the latched position. The strut assembly 62a has extended slightly. The counterweight 78a is shown in a lower position because of the upwards rotation of the final movable mould section 8a. The counterweight 76a is not shown as this has fallen under gravity to help urge the intermediate movable mould section 6a into the closed position, thereby helping to bend the glass sheet to the intermediate curvature 10b.

The gravity bending mould as shown in FIGS. 1 to 5 is in a first configuration that has each intermediate movable mould section in an operable position and each final movable mould section in an inoperable position. FIGS. 6 to 10 show views of the gravity bending mould in a second configuration wherein each intermediate movable mould section in an inoperable position and each final movable mould section in an operable position.

Figure 6:
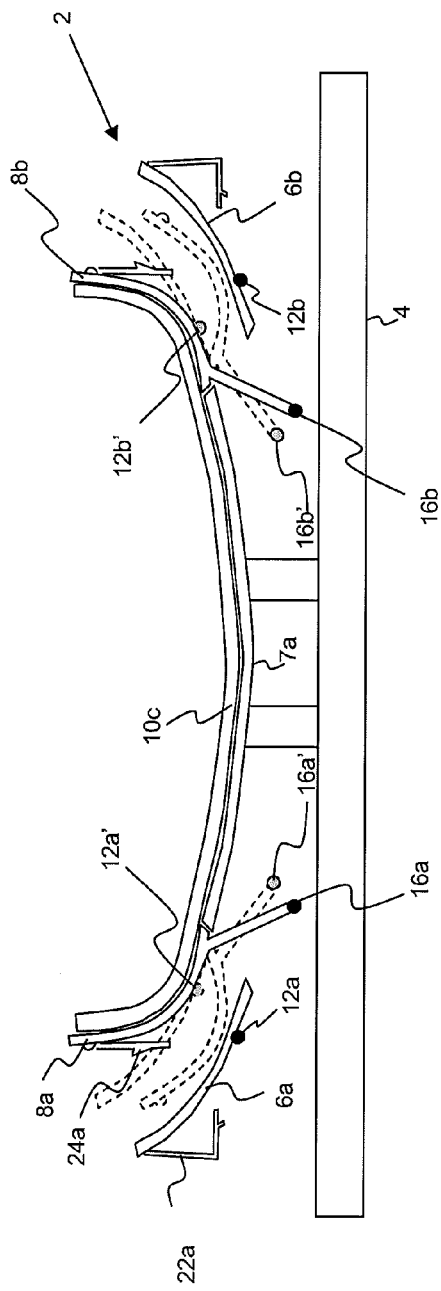
FIG. 6 is a schematic side elevation of the gravity bending mould of FIG. 1 wherein the intermediate movable mould sections are in an inoperable position and the final mould is in the closed position.
Figure 7:
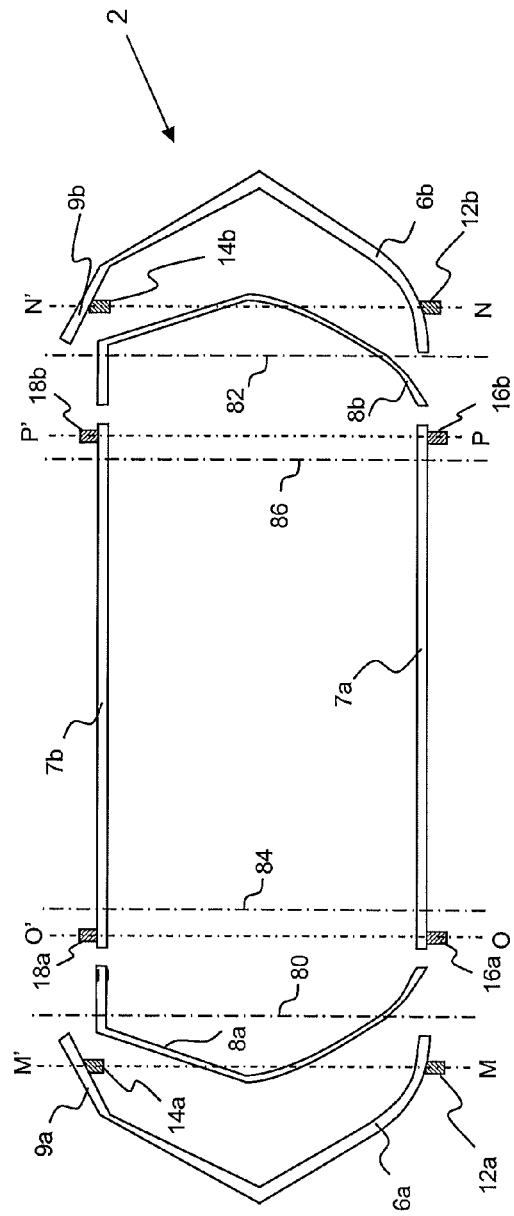
FIG. 7 shows schematically a plan view of the gravity bending mould as shown in FIG. 6.

With reference to FIGS. 6 and 7, the intermediate mould 6 has opened and each intermediate movable mould section has moved to an inoperable position. Each final movable mould section 8a, 8b has moved into an operable position and the final mould 8 has closed.

The positions of the movable mould sections prior to the mould moving from the first configuration to the second configuration are shown as dashed lines. The pivots 12a, 12b, 16a and 16b have moved from positions 12a', 12b', 16a' and 16b' respectively.

The intermediate pivot axes M-M' and N-N' and the final pivot axes O-O' and P-P' as shown in FIG. 2 have been designated by lines 80, 82, 84 and 86 respectively. FIG. 7 shows how the intermediate pivot axes M-M' and N-N' have been translated from the first positions 80 and 82 respectively to the second positions indicated. The figure also shows how the final pivot axes O-O' and P-P' have been translated from the first positions 84 and 86 respectively to the second positions indicated. The pivot axes in the second configuration are substantially parallel to the respective pivot axes when the mould is in the first configuration.

As the movable intermediate mould sections drop away to the inoperable position, articulated portions 9a and 9b open outwardly so that the respective final movable mould section can pass through the respective intermediate movable mould section into an operable position so that the final mould can close.

Each wing latching mechanism 20a, 20b is shown in the unlatched position such that when the final movable mould sections 8a, 8b have moved into the operable position, the final mould can close, assisted by the downward movement of counterweight 78*a*, 78*b*. When the final mould has closed, the final movable mould sections 8*a* and 8*b* take the place of the intermediate movable mould sections 6*a* and 6*b* respectively such that the glass sheet with final curvature 10*c* is supported on the final mould about a second peripheral line. The first peripheral line at least partially overlaps the second peripheral line, which results in reduced marking of the supported surface of the bent glass sheet.

In this particular embodiment the intermediate movable mould section 6*a*, 6*b* and the final movable mould section 8*a*, 8*b* have a side portion 9*a*, 9*b* that is common. Considering the left hand side of the mould, to allow the movable final mould section to rotate upwards past the movable intermediate mould section 6*a* when the linkage release mechanism 36*a* and the wing linkage mechanism 23*a* have been actuated, the common mould portion 9*a* must be moved out of the way to allow the movable final mould section 8*a*, 8*b* to close. In the embodiment shown, the intermediate movable mould section has an articulated portion 9*a* that can be opened outwardly so that the movable final mould section 8*a* can pass through the intermediate movable mould section 6*a*.

The articulated portion 9*a* has a cam surface 11*a* on the inside surface. There is a corresponding cam surface 13*a* on the outer surface of the common portion of the movable final mould section. As the movable final mould section 8*a* rotates upwardly about the final pivot axis O-O' the surfaces of the two cams 11*a* and 13*a* co-operate, thereby opening the articulated portion 9*a* so that the final movable mould section can pass and move into an operable position wherein the final movable mould section is able to move into the closed position. There is a corresponding sequence that moves the articulated portion 9*b*.

An articulated portion is not required on the lower portion of the movable intermediate mould section opposite portion 9*a*, 9*b* because the displacement member has sufficiently displaced the movable intermediate mould section so that the movable final mould section can pass through unimpeded.

Figure 8:
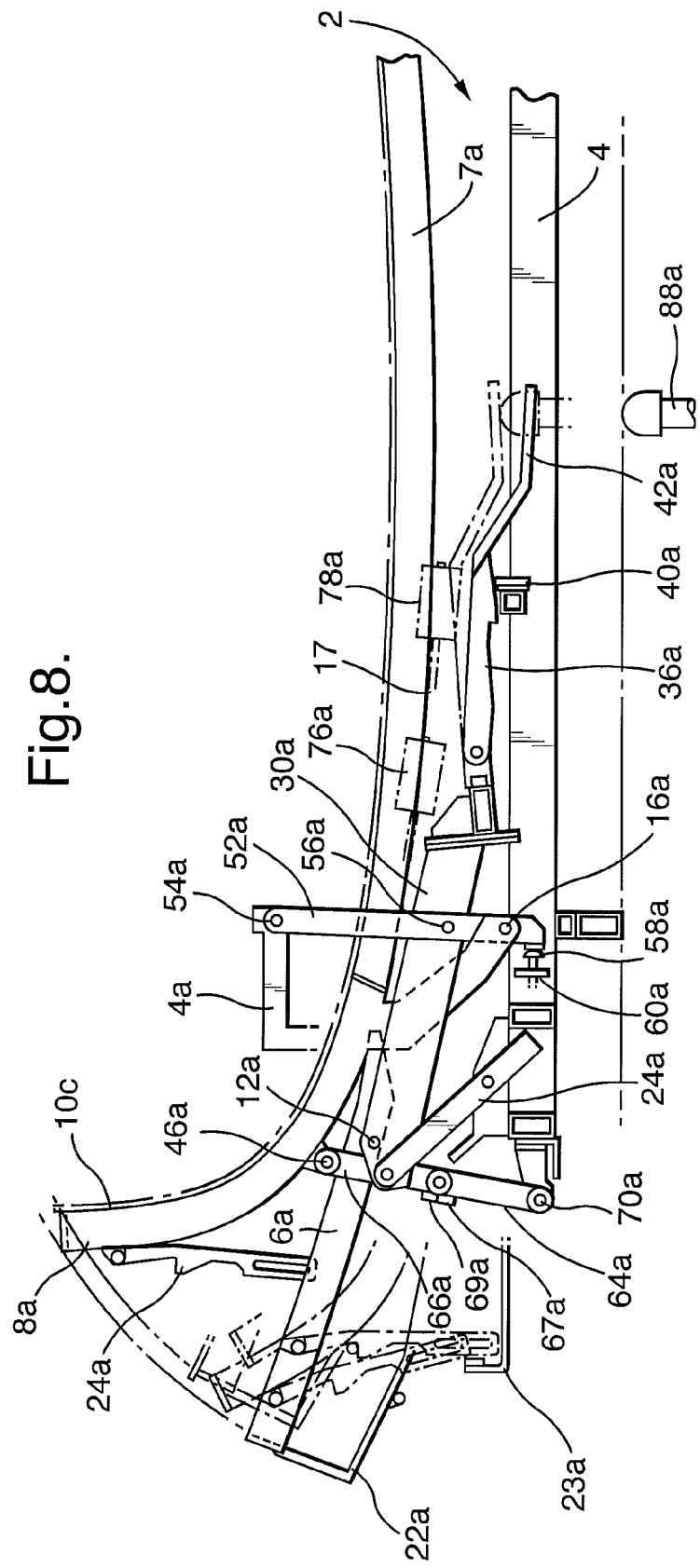
FIG. 8 shows in more detail a side view of the left hand side of the gravity bending mould as shown in FIG. 6.

FIG. 8 shows a detailed view of the left hand side of the mould shown in FIG. 6. The linkage release mechanism 36*a* has been released by actuator 88*a* pushing upwards on latch release arm 42*a* thereby allowing the linkage members 30*a*, 32*a* to move outwardly away from the fixed mould sections 7*a*, 7*b*. Releasing the linkage release mechanism allows the displacement member 52*a* to rotate about the upper pivot 54*a* in a pendulum like manner, thereby allowing intermediate movable mould section 6*a* to drop away from the bent glass sheet 10*b* and to move to an inoperable position. The toe 58*a* at the lower end of the displacement member 52*a* rests against abutment 60*a*. The strut assembly 62*a* is in the fully extended position, thereby providing support for the movable final mould section as the glass sheet bends from intermediate curvature 10*b* to final curvature 10*c*. The flanges 42*c* and 42*d* towards the elbow of the strut assembly 62*a* prevent the strut from collapsing.

The counterweight 78*a* has fallen under gravity to the position shown and this has helped urge the final movable mould section 8*a* into the closed position, thereby bending the bent glass sheet 10*b* to the glass sheet having final curvature 10*c*.

Preferably the wing latching mechanism 20*a*, 20*b* is released at the same time as the linkage release mechanism 36*a*, 36*b* or at some time shortly thereafter. When the intermediate movable mould section 6*a*, 6*b* has dropped away, the glass sheet 10*b* is temporarily unsupported in those regions until the final moveable mould section 8*a*, 8*b* moves into the operable position and closes to take the place of the intermediate movable mould section 6*a*, 6*b*. The length of time that the glass sheet is unsupported should be such that optical distortion of the final bent glass sheet is kept to an acceptable level.

The glass sheet is bent to the final desired shape 10*c* and is supported on the rim of the final mould in the closed position about a second peripheral line. The glass sheet 10*c* is supported on the rim of the final mould in the closed position about substantially the same peripheral line as when the intermediate bent glass sheet 10*b* is supported on the rim of the closed intermediate mould. This is because the final pivot axes O-O' and P-P' have moved sufficiently outwards so that the final movable mould sections have moved to an operable position wherein the final movable mould sections are able to close.

Figure 9:
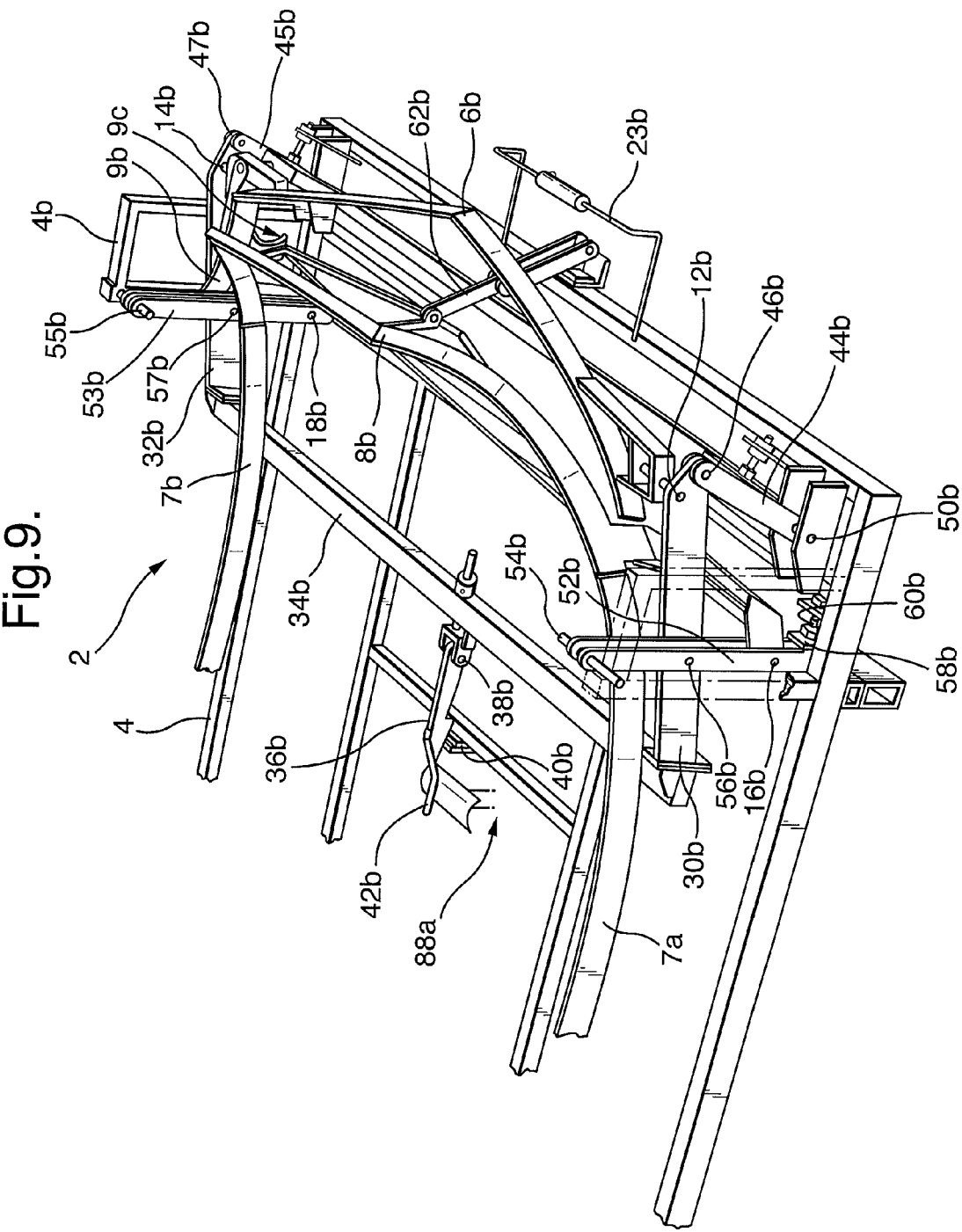
FIG. 9 is a perspective elevation of the right hand side of the gravity bending mould as shown in FIG. 6.

FIG. 9 shows an isometric perspective view of the right hand side of the mould shown in FIG. 6. Linkage members 30*b* and 32*b* are connected by cross member 34*b*. The linkage release mechanism 36*b* is pivotally connected to the cross member by pivot 38*b*. The intermediate movable mould section 6*b* is pivotally mounted between the linkage member on pivots 12*b* and 14*b*. There is a support 44*b* that is pivotally mounted at one end to the linkage member 30*b* on pivot 46*b* and at the other end to the framework on pivot 50*b*. The linkage member 32*b* has a similar support 45*b*, pivotally mounted at one end to the linkage member 32*b* on pivot 47*b* and at the other end to the framework.

The linkage release mechanism comprises a latch release arm 42*b*. Pushing upwards on the latch release arm 42*b* releases the latch release member from the stop 40*b*, as shown. Actuator 88*a* has been used to lift the latch release arm. There may be an actuator to lift each of the latch release arms 42*a* and 42*b*. If there is a mechanical connection between the linkage release mechanism 36*b* and the latch release mechanism 23*b*, a common actuator may be used to disconnect latch pin 26*b* at the same time as releasing the linkage release mechanism.

Both the displacement members 52*b* and 53*b* are shown in the at rest position. Displacement member 52*b* is pivotally mounted to the framework by an upper pivot 54*b*. The linkage member 30*b* is mounted between the spaced legs of displacement member 52*b* on central pivot 56*b*. On the lower end of the displacement member 52*b*, the final movable mould section 8*b* is pivotally mounted on pivot 16*b*. The toe 58*b* on displacement member 52*b* is shown resting against abutment 60*b*.

Displacement member 53*b* is pivotally mounted to the framework 4*b* by an upper pivot 55*b*. The linkage member 32*b* is mounted between the spaced legs of displacement member 53*b* on central pivot 57*b*. On the lower end of the displacement member 53*b*, the final movable mould section 8*b* is pivotally mounted on pivot 18*b*.

The strut assembly 62*b* is shown fully extended and provides a means for supporting the final movable mould section in the closed position.

Figure 10:
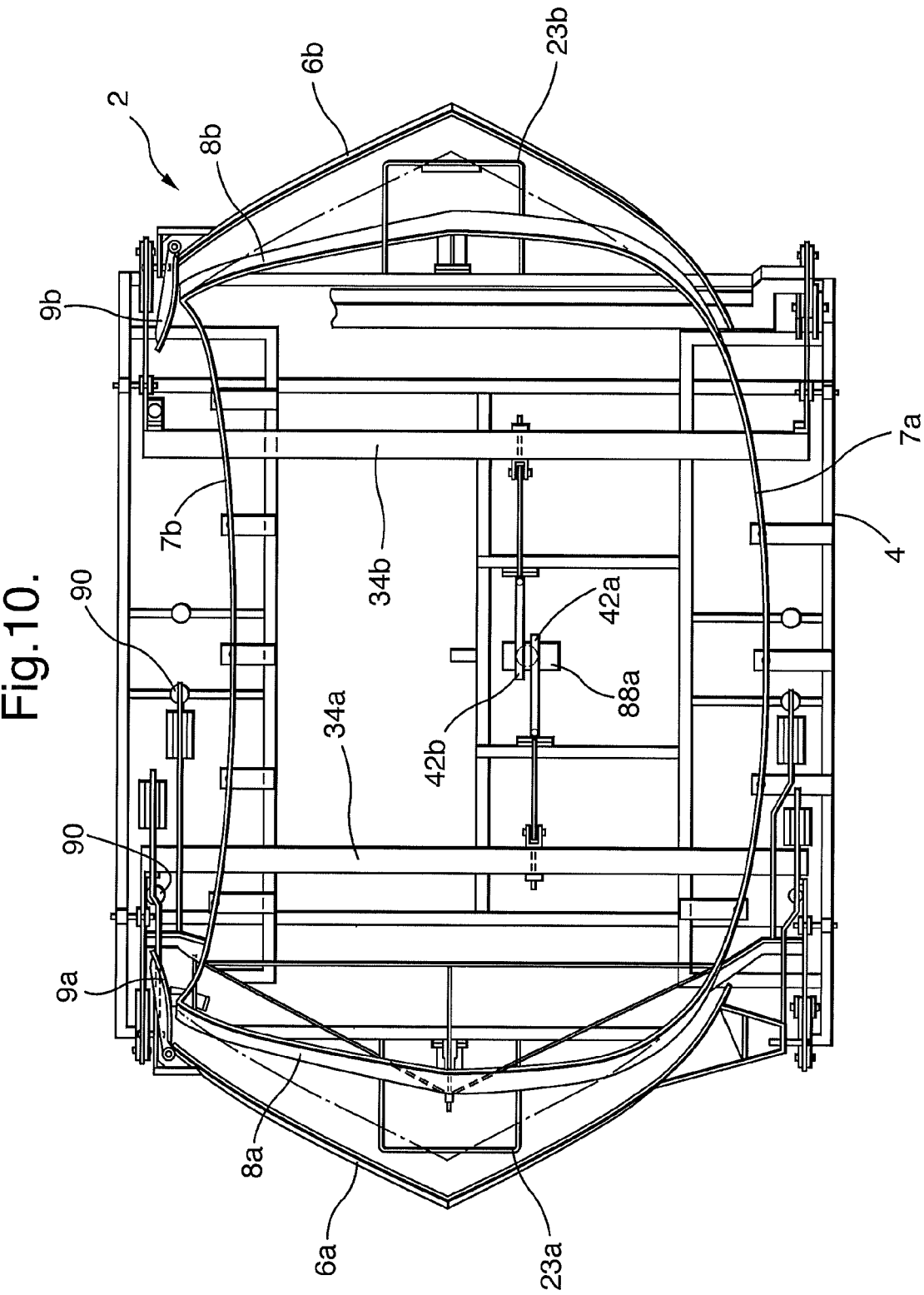
FIG. 10 is a more detailed plan view of the gravity bending mould as shown in FIG. 7.

FIG. 10 shows a detailed plan view of the mould as shown in FIGS. 6 and 7. When the final mould is closed and the intermediate mould is open, the counterweights 76*a*, 78*a* rest on stops 90.

The bending operation will now be described.

Initially the gravity mould is disposed in the position shown in FIGS. 1 and 3. Each linkage release mechanism 36*a*, 36*b* is latched on to respective stop 40*a*, 40*b*. The latch pin 26*a*, 26*b* is latched onto latch 24*a*, 24*b* so that the intermediate movable mould section 6*a*, 6*b* is releasably connected to the final movable mould section 8*a*, 8*b*. The intermediate movable mould section 6*a*, 6*b* is rotated about the respective pivot axis M-M', N-N' and moved into a raised position with respect to the fixed mould sections 7a and 7b. A flat glass sheet or sheets 10a is placed onto the intermediate movable mould sections and the weight and rigidity of the glass sheet or sheets maintains the intermediate movable mould sections in a substantially horizontal position. The glass sheet is supported by end portions of the intermediate movable mould sections 6a and 6b.

Figure 11:
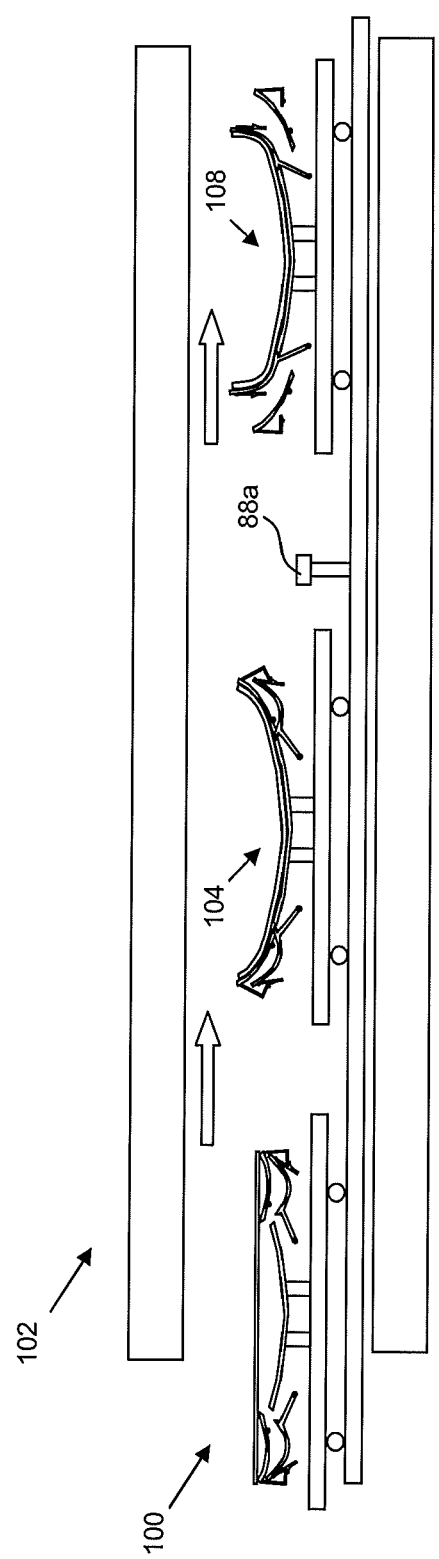
FIG. 11 is a schematic side elevation of a plurality of the gravity bending moulds passing through a furnace for bending glass sheets in accordance with the present invention.

The assembly 100 of glass sheet or sheets and the gravity bending mould is then passed through a heating furnace 102, as shown schematically in FIG. 11. The mould is mounted on a suitable trolley or conveyor system. As the glass sheet or sheets is heated, it softens and progressively sags downwardly under gravity, permitting each intermediate movable mould section 6a, 6b progressively to be rotated upwardly about their respective pivot axis under the action of counterweights 76a, 76b, thereby to progressively bend the glass sheet or sheets and close the intermediate mould. When the intermediate mould is closed the glass sheet or sheets is supported on the rim of the intermediate mould about a first peripheral line. The intermediate mould is shown in the closed position at 104.

During a first phase of the glass bending operation, the ends of the glass sheet or sheets are supported on the end sections of the intermediate movable mould sections 6a and 6b. As each intermediate movable mould section rotates upwardly about the respective intermediate pivot axis, each final movable mould section rotates upwardly about the respective final pivot axis because each intermediate movable mould section 6a, 6b is connected to the respective final movable mould section 8a, 8b by the respective wing latching mechanism 20a, 20b. The lower glass surface sags into contact with the rim of the intermediate movable mould sections and the rim of the fixed mould sections 7a, 7b. As the glass softens, the intermediate movable mould sections 6a and 6b are rotated upwardly, engaging the glass sheet, until the intermediate mould is closed. This forms an intermediate curved shape 10b for the glass sheet or sheets, said sheet or sheets being supported on the intermediate rim of the closed intermediate mould about a first peripheral line. This is shown at 104. The glass sheet or sheets and the gravity bending mould may be kept in this position for any desired time, for example, until a particular temperature profile has been achieved to achieve superior bending behaviour in a second phase.

The ends of the glass sheet or sheets are given a relatively small preliminary longitudinal curvature in the first phase, which is significantly smaller than the final longitudinal curvature in the ends. The central portion of the glass sheet or sheets has an intermediate curvature substantially the same as that desired for the final curvature of the glass sheet. The first phase is completed at a particular location in the furnace.

In FIGS. 4, 5 and 11 at position 104, the glass sheet is shown supported on the intermediate mould about a first peripheral line.

After the desired intermediate curvature has been introduced by closing the intermediate mould, in a subsequent second phase of the glass bending operation the linkage release mechanism 36a, 36b is released by operation of actuator mechanism 88a, external of and separate from the bending mould, which is located inside or outside the furnace 102. The linkage release mechanism 36a, 36b is mechanically connected to the respective wing latch release mechanism 23a, 23b, so that as the actuator 88a moves upwards against each latch release arm 42a, 42b the wing latch release mechanism 23a, 23b is moved inwardly thereby releasing the latch pin 26a, 26b from the respective latch 24a, 24b.

When each linkage release mechanism 36a, 36b is unlatched, the respective pair of displacement members 52a, 53a, and 52b, 53b rotate outwardly about the respective upper pivot in a pendulum like manner. The rotation of the displacement members moves the respective linkage member and lower pivot outwards. The displacement member is prevented from rotating further by the toe on the lower part of each displacement member contacting the abutment on the framework. The pair of displacement members 52a, 53a move the linkages members 30a, 32a downwards and outwards (and similarly for the right hand side of the mould).

It will be readily apparent that at this point in the second phase, the glass sheet is unsupported in the end portions because the intermediate movable mould section 6a, 6b have fallen away and moved into an inoperable position. If the wing latch release mechanism is not released at the same time as the linkage release mechanism, a separate actuator (not shown) should be used to release the wing linkage mechanism. This removes the connection between the movable sections such that the final movable mould sections, having moved to the operable position, can rotate upwards about the respective final pivot axis, engage the glass sheet, and close the final mould. If the glass sheet in the end portions is unsupported for too long, the glass will sag sufficiently such that the resulting bent glass sheet has a poor quality.

The final movable mould section 8a, 8b takes the place of the intermediate movable mould sections 6a, 6b so that the glass sheet is supported about substantially the same peripheral line throughout the bending process. That is, there is partial overlap between the line of contact between the upper rim of the intermediate mould in the closed position and the intermediate bent glass sheet 10b and the line of contact between the upper rim of the final mould in the closed position and the final bent glass sheet 10c.

With reference to FIGS. 12 and 13, there is shown a different mould according to the first aspect of the invention. The gravity bending mould 202 has an intermediate mould and a final mould. The intermediate mould has two intermediate movable mould sections 206a and 206b and the final mould has two final movable mould sections 208a and 208b. The intermediate movable mould section 206a is mounted on pivots 212a and 214a defining an intermediate pivot axis Q-Q'. The movable intermediate mould section 206b is mounted on pivots 212b and 214b defining an intermediate pivot axis R-R'. Movable intermediate mould section 206a can rotate about the intermediate pivot axis Q-Q' and movable intermediate mould section 206b can rotate about intermediate pivot axis R-R'. The movable final mould section 208a is mounted on pivots 216a and 218a, said pivots defining a final pivot axis S-S'. The movable final mould section 208b is mounted on pivots 216b and 218b, said pivots defining a final pivot axis T-T'. Movable final mould section 208a can rotate about the final pivot axis S-S' and movable final mould section 208b can rotate about the final pivot axis T-T'.

The mould 202 has no fixed mould sections and the moulds do not have any mould sections in common. In the configuration shown in FIGS. 12 and 13, the intermediate movable mould sections are in an operable position and the final movable mould sections are in an inoperable position.

FIG. 13 shows the gravity bending mould with a flat sheet of glass 10a placed on the intermediate mould. The movable intermediate mould sections 206a and 206b are in a substantially horizontal position and the intermediate mould is held in an open position by the weight and rigidity of the glass sheet.

Figure 14:
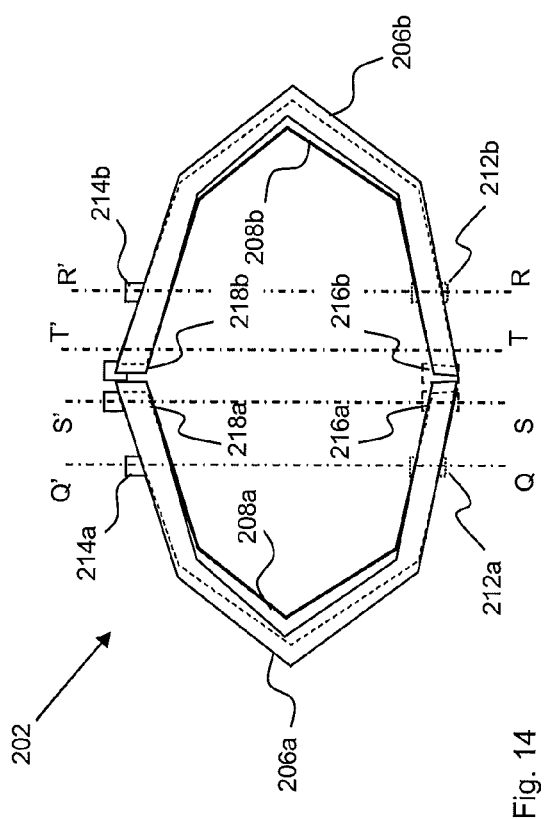
FIG. 14 shows schematically a plan view of the mould of FIG. 12 where the intermediate mould is in the closed position and the final movable mould sections are in an inoperable position.
Figure 15:
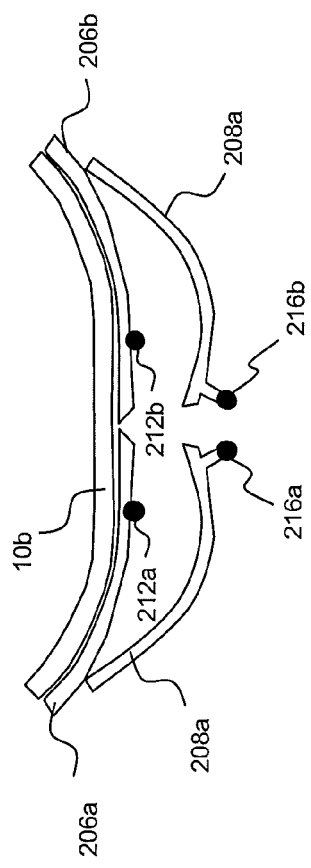
FIG. 15 shows schematically a side view of the mould as shown in FIG. 14.

In FIGS. 14 and 15, heat has been applied causing the glass sheet 10a to soften and sag under gravity. Each intermediate movable mould section 206a and 206b has rotated upwardly about the respective pivot axis Q-Q' and R-R', thereby closing the intermediate mould. The glass sheet engages the intermediate mould by sagging into contact with the rim of the intermediate mould such that the glass sheet has an intermediate curvature 10b. At this point the glass sheet is supported on the rim of the intermediate mould about a first peripheral line.

The movable final mould sections 208a, 208b may be connected to the movable intermediate mould sections 206a, 206b respectively, such that as the movable intermediate mould section 206a, 206b rotates about the intermediate pivot axis Q-Q', R-R', the movable final mould section 208a, 208b rotates about the final pivot axis S-S', T-T'.

Figure 16:
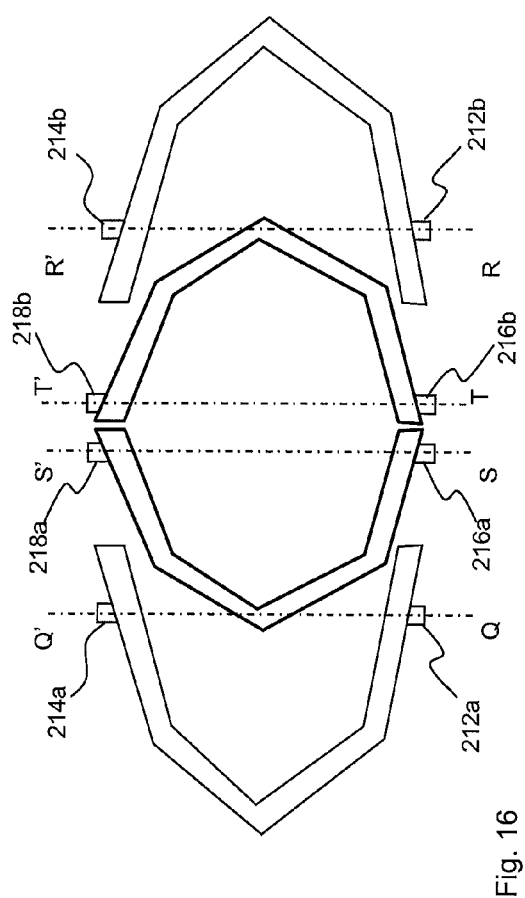
FIG. 16 shows schematically a plan view of the mould of FIG. 12 where the intermediate movable mould sections are in an inoperable position and the final mould is in the closed position.
Figure 17:
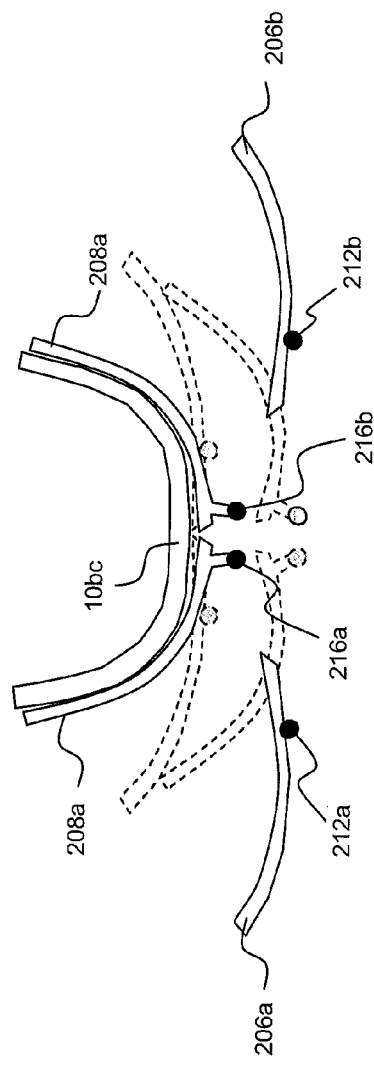
FIG. 17 shows schematically a side view of the mould as shown in FIG. 16.

In FIGS. 16 and 17 the positions of the pivot axes as shown in FIGS. 12 to 15 have been translated so that the intermediate movable mould sections 206a and 206b are in an inoperable position and the final movable mould sections 208a and 208b are in an operable position. The final movable mould sections 208a and 208b are now able to close, engaging the glass sheet such that the glass sheet is further bent to the final shape 10c and is supported on the rim of the final mould in the closed position. The final movable mould section 208a, 208b takes the place of the intermediate mould sections 206a, 206b so that the glass sheet is supported about substantially the same peripheral line throughout the bending process. The glass sheet is supported on the final mould about a second peripheral line such that there is partial overlap between the first peripheral line and the second peripheral line.

In FIG. 17, the positions of the movable mould sections 206a, 206b, 208a and 208b prior to the intermediate mould opening and the final mould closing are shown by dashed lines.

FIGS. 18 to 22 show a different embodiment of a gravity bending mould for bending glass sheets according to the first aspect of the present invention.

The gravity bending mould 302 is mounted on a framework 304 and has an intermediate mould and a final mould. The intermediate mould comprises a substantially 'U'-shaped fixed portion 307. The 'U' shaped portion 307 has a pair of substantially parallel straight rails 307a and 307b joined by a curved portion 307c. The intermediate mould has one intermediate movable mould section mounted at the end of the straight rails 307a and 307b. The intermediate mould has an articulated portion 309a.

The final mould comprises 'U' shaped portion 307 and a final movable mould section 308a mounted at the ends of the straight rails 307a and 307b.

Figure 18:
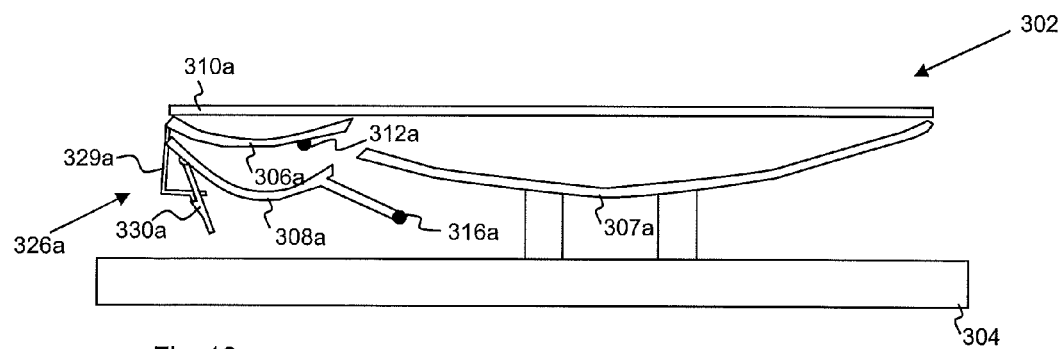
FIG. 18 shows schematically a side view of another mould according to a first aspect of the invention, wherein the mould is articulated at one end only and the intermediate mould is in an open position and the final movable mould section is in an inoperable position

In FIG. 18, the intermediate mould is shown in an open position. The intermediate movable mould section 306a is in an operable position and the final movable mould section 308a is in an inoperable position. A flat sheet of glass 310a is shown placed on the intermediate mould.

Figure 19:
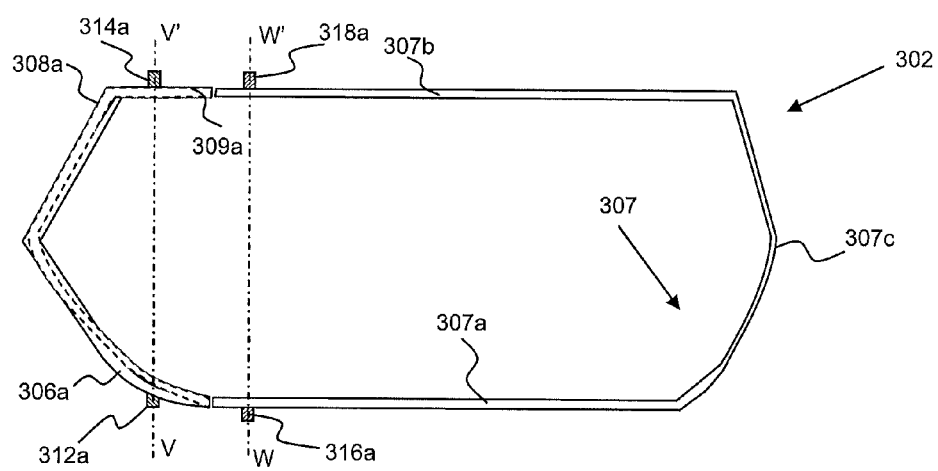
FIG. 19 shows a schematic plan view of the mould shown in FIG. 18.

The intermediate movable mould section 306a is pivotally mounted by pivots 312a and 314a between a pair of linkage members (not shown). The pivots 312a and 314a define a pivot axis V-V' about which the intermediate movable mould section can rotate. The pivot axis V-V' shown in FIG. 19 is at a position such that the intermediate movable mould section 306a is in the operable position.

The final movable mould section is pivotally mounted on pivots 316a and 318a. The pivots 316a and 318a define a pivot axis W-W'. In FIG. 19, the pivot axis W-W' is positioned such that the final movable mould section 308a is in the inoperable position.

There is a wing latching mechanism 320a comprising a linkage 322a that has a latch pin 326a. The intermediate movable mould section 306a is mechanically connected to the final movable mould section 308a by engaging the latch pin 326a with the latch 324a. The latch 324a is pivotally mounted to the final movable mould section 308a by the pivot 328a.

Figure 20:
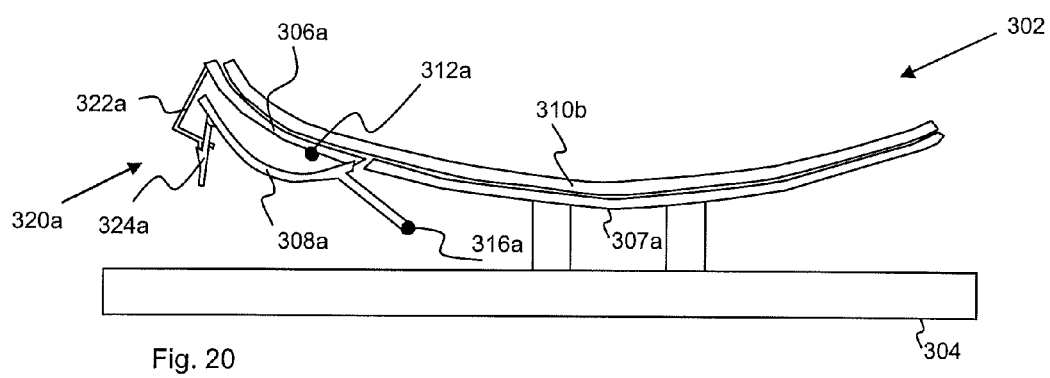
FIG. 20 shows schematically a side view of the mould shown in FIG. 18 wherein the intermediate mould is in the closed position and the final movable mould section is in an inoperable position.

In FIG. 20, the mould 302 and glass sheet are shown after heating to a temperature sufficient to soften the glass sheet so that it can bend under gravity. The intermediate mould is shown in the closed position and the sheet of glass has been bent to an intermediate shape 310b. The final movable mould section has rotated upwards about pivot axis W-W' due to the mechanical connection with the intermediate movable mould section 306a. At this stage, the intermediate movable mould section is in the operable position and the final movable mould section is still in the inoperable position.

Figure 21:
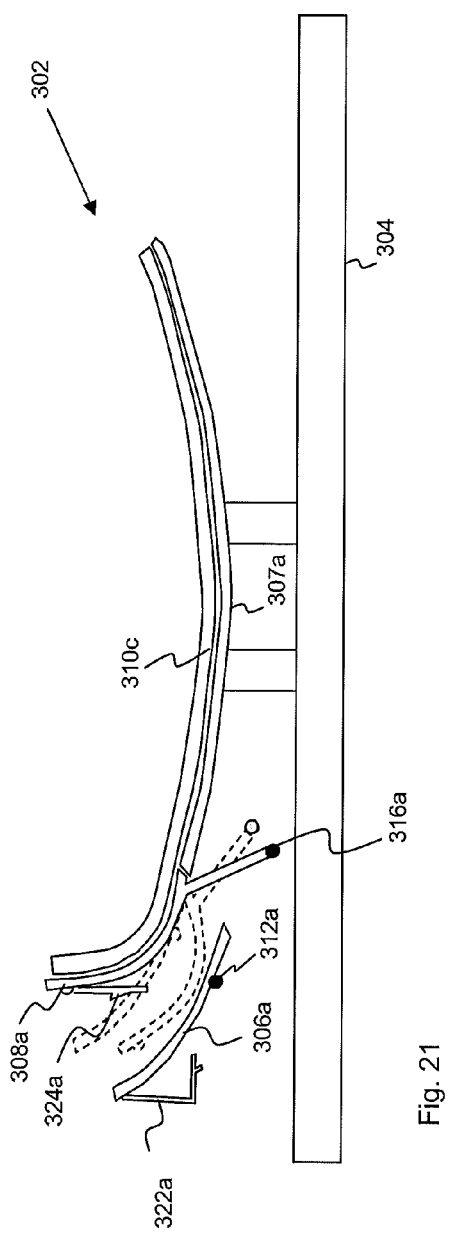
FIG. 21 shows schematically a side view of the mould shown in FIG. 18 wherein the movable intermediate mould section is in an inoperable position and the final mould is in the closed position.
Figure 22:
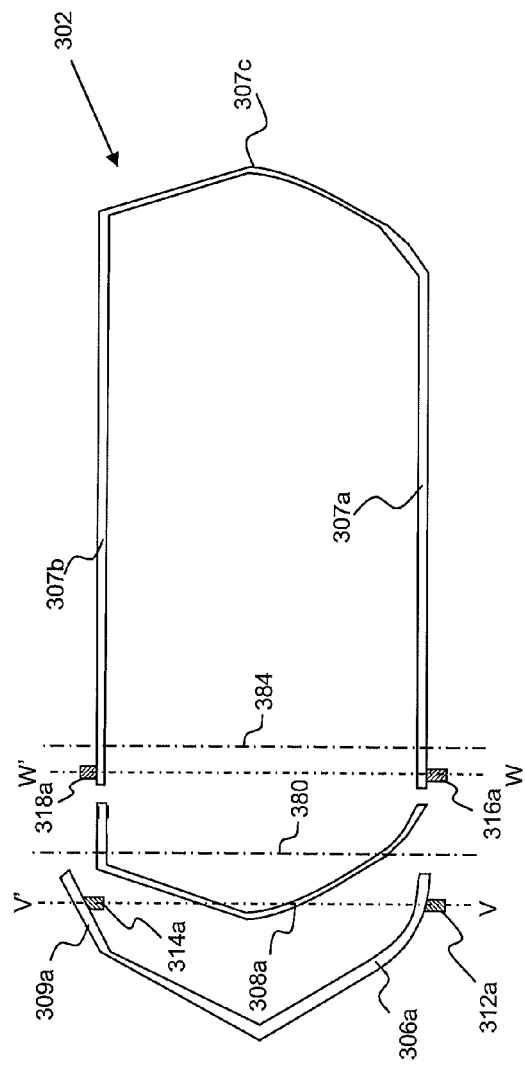
FIG. 22 shows a plan view of the mould as shown in FIG. 21.

FIGS. 21 and 22 show the mould 302 when the intermediate movable mould section has fallen away to an inoperable position and the final movable mould section has moved to an operable position and has subsequently closed. The position of the movable mould sections prior to the intermediate movable mould section having fallen away to an inoperable position and the final movable mould section having moved to the operable position and closing are shown by dashed lines in FIG. 21. The wing latching mechanism 320a has been disconnected so that the final movable mould section can rotate about the axis W-W' when in the operable position. The positions of the axes V-V' and W-W' shown in FIG. 19 are indicated in FIG. 22 by lines 380 and 384 respectively.

The articulated portion of the intermediate mould has moved outwardly so that the final movable mould section moves to the operable position and is able to move into the closed position.

The present invention has particular application in the manufacture of vehicle windscreens for which a high degree of curvature is desired to be introduced into the edges or corners of the glass sheets.

The embodiments of the present invention provide the technical advantage that the glass sheet is only contacted about substantially one peripheral line and not two, thereby reducing the number of mould indentations on the surface of the glass which results in an improvement in the surface quality of the bent glass sheet.

The invention claimed is:

1. A gravity bending mould for bending glass sheets comprising an intermediate mould having an intermediate movable mould section, and a final mould having a final movable mould section, each movable mould section being movable between an upper, operable position toward an upper side of the gravity bending mould and a lower, inoperable position toward a lower side of the gravity bending mould, respectively, the intermediate and final movable mould sections being adapted successively to engage a glass sheet during a gravity bending operation, and a mechanical connection between the intermediate and final movable mould sections, the mechanical connection being selectively disposable in a first configuration, at which the intermediate and final movable mould sections are in the upper, operable and lower, inoperable positions respectively, and in a second configuration, at which the final and intermediate movable mould sections are in the upper, operable and lower, inoperable positions respectively, wherein when the mechanical connection is moved from the first configuration to the second configuration, the intermediate movable mould section moves to the lower, inoperable position and the final movable mould section correspondingly moves to the upper, operable position to take the place of the intermediate moveable mould section.

2. A gravity bending mould according to claim 1, wherein each movable mould section has a respective upper shaping surface, each upper shaping surface being moved along a respective locus between an open position and a closed position when the respective movable mould section is in the upper, operable position, and wherein the loci of the intermediate and final movable mould sections at least partially intersect.

3. A gravity bending mould according to claim 2 wherein at a location where the loci of the intermediate and final movable mould sections at least partially intersect, the positions of the respective upper shaping surfaces at least partially overlap.

4. A gravity bending mould according to claim 3, wherein each movable mould section is adapted to move about a respective intermediate and final pivot axis between an open position and a closed position when the respective movable mould section is in the upper, operable position.

5. A gravity bending mould according to claim 4, wherein the mechanical connection supports the intermediate and final pivot axes which are simultaneously translated from an initial position to a final position when the mechanical connection is moved from the first configuration to the second configuration.

6. A gravity bending mould according to claim 5, wherein the mechanical connection includes a pendulum and the mechanical connection is moved from the first configuration to the second configuration by releasing the pendulum which falls under the action of gravity.

7. A gravity bending mould according to claim 6, wherein the mechanical connection includes a linkage member that is mechanically connected to the intermediate movable mould section, the respective final movable mould section and the pendulum.

8. A gravity bending mould according to claim 7, wherein the intermediate movable mould section is pivotally mounted to the linkage member.

9. A gravity bending mould according to claim 1, wherein the final movable mould section has an articulated portion.

10. A gravity bending mould according to claim 1, wherein the intermediate movable mould section has an articulated portion.

11. A gravity bending mould according to claim 10, wherein the articulated portion comprises a first cam surface that cooperates with a second cam surface on the corresponding final movable mould section.

12. A gravity bending mould according to claim 1, wherein the mechanical connection comprises a latching mechanism that holds the intermediate movable mould section in the upper, operable position, and which when unlatched, allows the moveable intermediate movable mould section to move to the lower, inoperable position.

13. A gravity bending mould according to claim 1, wherein the intermediate movable mould section moves to the lower, inoperable position by dropping away under gravity.

14. A gravity bending mould according to claim 1, wherein the mechanical connection comprises a latching mechanism arranged such that the final movable mould section is connectable with the respective intermediate movable mould section, and when the latching mechanism is in the latched position, the upper surface of the final movable mould section is lower than the upper surface of the respective intermediate movable mould section, and when unlatched, the upper surface of the final movable mould section moves to a position higher than the upper surface of the respective intermediate movable mould section.

15. A gravity bending mould according to claim 1, wherein the intermediate mould has a smaller curvature than the final mould.

16. A glass sheet bending apparatus, the apparatus comprising a plurality of gravity bending moulds according to claim 1, a furnace, a conveyor system for successively conveying the plurality of gravity bending moulds through the furnace, the furnace including at least one first actuator mechanism provided inside or outside the furnace at a predetermined location along the furnace length, the actuator mechanism being adapted to operate the mechanical connection to cause the mechanical connection to move from the first configuration to the second configuration as each respective gravity bending mould is conveyed past the first actuator mechanism.

17. A method of gravity bending a glass sheet, the method comprising:
providing a gravity bending mould comprising an intermediate mould having an intermediate rim and at least one intermediate movable mould section, and a final mould having a final rim and at least one final movable mould section, each movable mould section being movable between an upper, operable position toward an upper side of the gravity bending mould and a lower, inoperable position toward a lower side of the gravity bending mould, respectively and there being a mechanical connection between the intermediate and final movable mould sections;
disposing the intermediate mould in a raised position with respect to the final mould;
placing at least one flat glass sheet on the intermediate mould with the movable intermediate mould section being in a substantially horizontal open position, the at least one flat glass sheet being supported by at least one portion of the movable intermediate mould section when the intermediate mould is in an open position;
gravity bending the at least one flat glass sheet in a furnace by heating the at least one glass sheet, the heating causing softening of the at least one glass sheet thereby to gravity bend the at least one glass sheet, the gravity bending step comprising two phases, including
a first phase wherein the intermediate movable mould section is in the upper, operable position and the final movable mould section is in the lower, inoperable position and the mechanical connection is disposed in a first configuration, further wherein the at least one flat glass sheet is bent to an intermediate bent shape by the intermediate mould, such that the intermediate rim contacts the at least one glass sheet about a first peripheral line; and
a second phase, after the first phase, in which the mechanical connection is moved from the first configuration to a second configuration such that the at least one intermediate movable mould section moves into the lower, inoperable position and the at least one final movable mould section moves into the upper, operable position, the final mould being disposed in a raised position with respect to the intermediate mould, to take the place of the intermediate mould, and the at least one glass sheet is bent from the intermediate bent shape to a final bent shape by closing the final mould, such that the final rim contacts the at least one glass sheet about a second peripheral line.

18. A method according to claim 17, wherein there is partial overlap between the first peripheral line and the second peripheral line.

19. A method according to claim 18, wherein during the first phase, the at least one intermediate movable mould section moves into the closed position, thereby substantially completing the intermediate rim.

20. A method according to 18, wherein during the second phase, the at least one intermediate movable mould section moves into the lower, inoperable position and the at least one final movable mould section moves into the upper, operable position such that the at least one final movable mould section is able to move into the closed position.

* * * * *